Patented June 3, 1941

2,244,194

UNITED STATES PATENT OFFICE 2,244,194

PROCESS FOR EXTRACTION OF ALUMINA

Ture Robert Haglund, Stockholm, Sweden

No Drawing. Application August 3, 1937, Serial No. 157,227. In Sweden October 23, 1936

21 Claims. (Cl. 23—143)

This invention relates to the extraction of alumina from bauxite, and similar materials.

According to present methods for extracting alumina from bauxite by means of alkaline solutions, particularly solutions of alkali-aluminate, the bauxite, after calcining at a comparatively low temperature, is introduced in a finely divided state into an autoclave in which the bauxite is treated, while being stirred, with an alkali solution of more than 40° Bé. When the treatment in the autoclave has been brought to a finish the mixture is cooled and diluted to about 25° Bé. and afterwards filtered for the separation of unreacted residue from the extraction. Aluminum hydroxide is then precipitated from the filtered solution by means of stirring. The solution which remains after separation of the precipitated aluminum hydroxide by filtration, is concentrated by means of evaporation to more than 40° Bé., and is again used for the extraction of alumina from a new quantity of bauxite. A disadvantage when using such process is the fact, that the most easily extracted part of the bauxite is extracted by the lye while this is most active, whereas that part of the bauxite which is more difficult to dissolve, must chiefly be dissolved by the aid of less active solution. This makes it necessary to employ a longer time for the extraction and a more concentrated alkali solution for obtaining a good yield, than would otherwise be necessary.

According to a modification of the alkali digestion process one has therefore turned to the continuous conveying of an alkali solution in pressure-towers through a layer of bauxite, which rests on filterplates. By this, the advantage is obtained, that the treatment of that part of the bauxite which is more difficult to digest, can be carried out with a more fresh and reactive solution. This advantage is, however, counteracted, partly by the fact that sludge remaining from the digestion of the bauxite will inclose the undigested bauxite grains, whereby their continued digestion is rendered more difficult, and partly by the fact, that it is impossible to employ a high layer of bauxite in the tower, since the layer of sludge above the filterplates in such cases would become too thick to allow of a satisfactory filtering speed.

The drawbacks, which are connected with above mentioned processes are eliminated by means of the present invention. According to the invention, finely dispersed sludge is continuously or intermittently removed from the alumina containing material, such as bauxite which is being treated. This removal of sludge is preferably effected by conducting an ascending stream of the leaching solution used in the digestion, continuously or intermittently, through a layer of the material which is being digested, thereby causing the liquid to carry with it at least that part of the sludge which is in the most finely dispersed state. The treatment is suitably carried out in pressure-towers or reaction zones into the lower part of which the solution is introduced and from the upper part of which it is removed together with part of the sludge preferably chiefly continuously. Two or more digesting towers are suitably arranged in series, and the fresh extraction liquid is suitably first introduced in that tower, in which the treatment is farthest advanced, and last conducted to that tower, which has been last charged. A countercurrent flow of leach liquor and bauxite is thus obtained. The charging with the alumina material, e. g. bauxite, is preferably done in such a way, that the tower which is to be charged is completely or partly emptied of solution, after which bauxite is introduced through an opening in the upper part of the tower, which is adapted to be closed. The bauxite may also be mixed in a separate apparatus with the leaching solution and continuously or intermittently forced or fed from this into the tower. Such material which is only partly digested and remains in the tower immediately previous to the fresh charging of this, as well as coarser residues of sludge, is either discharged previous to each charging with a fresh quantity of material, or else such residues are completely or partly left in the tower over longer periods of time, in order to obtain a more complete digestion. Since, as a rule, the main part of the residue from the digestion is removed in the form of finely dispersed sludge, the quantity of such coarser sludge-residues, will generally be comparatively small. In order to prevent too large a part of the undigested bauxite being removed in the form of sludge, before having had time to become digested, it is advisable not to carry the fine grinding of the bauxite too far. A reduction by crushing down to a grain size of maximum 5 mm. is preferable, although still coarser bauxite, as well as such as has been subjected to a still finer crushing-down, may be used. By co-relating the horizontal cross section of the tower to the quantity of liquid passing through it, it is possible to determine the rate of flow in the tower in such a manner, that even in cases in which comparatively finely divided bauxite is employed, the quantity of undigested bauxite, which will pass on and out of the tower, will not become too large. By employing towers with different horizontal sections at different heights, e. g. so that the middle part has a larger cross-sectional area than the lower part, and that the part of the tower higher up has a still larger cross-sectional area, it is possible to distribute or classify the bauxite according to particle size in different parts of the tower. In this manner it is further possible to keep a larger or smaller portion of the bauxite under treatment in suspension in the solution. Also the coarser particles may in this manner be brought into motion, although as a rule, it will be sufficient to bring the sludge, deriving from the coarser particles, into motion. The tower may suitably be built of conical and cylindrical parts.

By pumping part of the solution removed from the upper part of the tower again into the lower part of the tower, if preferred after removal of sludge from the liquid, the rate of flow of the liquid in the tower may be increased as desired. Instead of removing such circulating liquid from the upper part, the solution may be drawn from some middle section and again pumped to some lower part. The rate of flow in the upper part of the tower will in this manner become less. It is advantageous to cause the liquid in the tower to assume a rotary motion, e. g. by introducing the liquid tangentially. A stirring device may also be employed for the same purpose. It is suitable to combine the bridging of the solution into a rotary movement with allowing the pregnant liquor to escape from the upper part by a pipe or draw off which is centrally arranged in the liquid. The purpose of this is to delay the removal of those particles which have not yet had time to become digested. The rotary movement will carry the coarser particles of the sludge away from the upper central part of the tower outwards towards the walls. For the same purpose of delaying the removal of not completely reacted material, the exit opening for the liquid may also be arranged in the form of a rotary device provided with shovels or the like, between which the liquid, owing to the higher pressure in the tower, is forced out, while the rotating speed of the shovel-wheel is adjusted in such manner, that the comparatively coarser part of the sludge, thanks to the centrifugal force, is prevented from following the liquid out. By an adjustment of the speed of rotation, it is possible, according to requirements, to remove a larger or smaller portion of the sludge present in the upper part of the tower. It is particularly advisable to delay, or for a certain length of time to discontinue, the removal of sludge from the tower, during the period directly following the charging with bauxite.

One or more separate towers or containers are preferably arranged in series with the bauxite-tower or towers, in order to allow incompletely reacted sludge to react to completion in these. These extra towers are suitably provided with arrangements for the regulating of sludge removal as mentioned above, in which case such regulating may be dispensed with in the bauxite-towers. The coarser sludge or residue which by this process of adjustment accumulates, and which shows no tendency to become further comminuted by a continued treatment with alkali solution, is suitably intermittently discharged and may in such cases be collected separately from the finer sludge. Incompletely reacted sludge may also, if desired, together with part of the solution, be intermittently introduced in a separate container or autoclave for a final treatment.

Instead of removing the sludge by means of an upwardly directed current, it is for example also possible to begin the digestion or leaching while stirring and then to discontinue the stirring in order to give the larger sized particles a chance to settle; after which the supernatant liquid which contains finer sludge is removed, and is freed from its sludge-content by means of settling, centrifuging or filtering. After such purification the sludge-free lye may again be used for leaching purposes.

The temperature of the alkali solution is, during the digestion of the bauxite, preferably kept at at least 160°–180° C., and the pressure in the towers is preferably kept higher than what would correspond to the vapour pressure of the solution; that is, higher than autogenous pressures. The solution is heated in a pre-heater before being introduced in the bauxite-towers. These are preferably provided with a device for maintaining the desired temperature, in which case indirect heating, e. g. using steam, should be employed in order to avoid a dilution of the solution. If the towers are provided with special arrangements for circulating the liquid, the liquid may be pumped through heat-exchange apparatus outside the tower. The alkali leach liquor employed, consists preferably of the alkali-aluminate solution which is recovered after the precipitation of aluminum hydroxide by means of stirring. This solution may of course be used directly for extraction of alumina from bauxite according to the present process, but should, however, preferably first be subjected to a concentration. A concentration to about 30° Bé. will generally give a very satisfactory result, although it is of course also possible to employ solutions of such concentration as have hitherto been generally employed for digesting of bauxite by the Bayer-method.

The final solution, containing sludge, is subjected to filtering or centrifuging to free it from sludge, in which case the filtering may be aided by directly diluting the solution. It is suitable to subject the solution containing sludge, preferably while still hot and under high pressure, to a thickening treatment, in order to divide it into a sludge-free portion, or a portion poor in sludge, and a portion rich in sludge, after which the last mentioned product and, if desired, also the aforementioned product, is subjected to filtering. The thickening may be brought about by means of centrifugal action, in the same manner as described above in connection with the removal of solutions from the reaction-towers, or else arrangements known per se, may be used to obtain a thickening by partial filtration.

The heat which is accumulated in the solutions is suitably utilized in heat-exchangers for preheating fresh digesting solution.

It is understood that although the invention is chiefly described in connection with a digestion of bauxite with alkali solutions, it may as well be used for the digestion of other alumina containing materials, using various kinds of leaching solutions having the desired action on alumina.

I claim:

1. In the recovery of aluminum values from subdivided aluminiferous materials containing alumina, the process which comprises establishing a bed of such a material in a reaction zone, passing a hot caustic leach liquor capable of extracting alumina from said material upwardly through said zone, the velocity of said leach liquor being sufficient to wash the sludge particles formed in said process from said bed thereby producing a suspension of said sludge particles, and withdrawing the resulting pregnant liquor with entrained sludge particles from the top of said reaction zone.

2. In the recovery of aluminum values from subdivided aluminiferous materials containing alumina, the process which comprises establishing and maintaining a series of beds of such a material composed of particles of various sizes, passing a hot caustic leach liquor capable of extracting alumina from said material through said beds seriatim with a velocity sufficient to wash the sludge particles formed in said process from said beds and to produce at least a partial classification of the particles of said material in accordance with their size, said leach liquor being passed upwardly through said beds and being withdrawn at the top together with the finer particles entrained in said liquor, introducing a fresh bed of said material into said series adjacent the exit of said liquor and removing a spent bed of said material adjacent the entrance of said liquor, then passing said liquor in the same direction through the new series of beds.

3. In the recovery of aluminum values from subdivided aluminiferous materials containing alumina, the process which comprises leaching a series of beds of such a material by means of a hot caustic leach liquor capable of extracting alumina from said material, passing through said series on the counter-current principle, the said liquor passing through said beds in an upward direction and with sufficient velocity to entrain the fine sludge particles produced in the process.

4. In the recovery of aluminum values from subdivided aluminiferous materials of the nature of bauxite, the process which comprises introducing such a material having a particle size up to about 5 mm. and a caustic leach liquor into a reaction zone maintained at temperatures of the order of 160° to 180° C. and under superatmospheric pressures, maintaining at least part of said material in the form of a rotating suspension in said zone whereby at least partial classification of said material in accordance with the size of the particles is obtained, introducing leach liquor at the bottom of said zone and withdrawing the resulting pregnant liquor from a top central section of said zone in such manner that only the finer particles of the sludge formed in said process are entrained in said withdrawn liquor.

5. A process of extracting alumina from bauxite, comprising leaching a mass of bauxite, at least part of which is of coarse form, under superatmospheric pressure with an ascending flow of hot caustic alkali containing solution and slowing down the rate of flow of the solution at least during part of its way through the bauxite material, whereby only the more finely divided particles of the sludge formed in the process are entrained in said liquor.

6. A process for extracting alumina from bauxite, comprising charging bauxite into a reaction zone, leaching it under pressure with a hot caustic alkali containing solution, introducing said solution tangentially into the lower part of said zone, slowing down the rate of flow of the solution during at least part of its ascending movement in the said zone, and removing the resulting pregnant liquor, together with any entrained particles of sludge formed in said process, from an upper part of said zone.

7. In the recovery of aluminum values from subdivided aluminiferous materials containing alumina, the process which comprises establishing a bed of such a material composed of particles of various sizes in a reaction zone, passing a hot caustic leach liquor capable of extracting alumina from said material upwardly through said zone with a velocity sufficient to suspend sludge particles formed in the process and to partially classify said aluminiferous material in such manner that the smaller sized particles of said material are at least partly moved into the upper portion of said reaction zone leaving the larger particles in the lower portion of said zone, and withdrawing the resulting pregnant liquor from the top of said zone together with entrained fine sludge particles formed in said process.

8. In the recovery of aluminum values from subdivided aluminiferous materials containing alumina, the process which comprises establishing a bed of such a material composed of particles of various sizes in a vertical reaction zone of increasing cross-section upwardly, passing a hot caustic leach liquor capable of extracting alumina from said material upwardly through said zone with a velocity sufficient to suspend sludge particles formed in the process and to carry at least part of the smaller particles of said aluminiferous material upwardly from the narrower portion of said reaction zone, and withdrawing the resulting pregnant liquor from the top of said zone together with entrained fine sludge particles formed in the process.

9. In the recovery of aluminum values from subdivided aluminiferous materials containing alumina, the process which comprises producing a classification of such a material, composed of particles of various sizes, in a reaction zone containing a hot caustic leach liquor capable of extracting alumina from said material, passing the said leach liquor through said reaction zone in an upward direction slowing down the rate of flow of said liquor at at least one point in the top of said reaction zone sufficiently so that only the finer particles of sludge formed in the process remain in suspension at said point and withdrawing the liquor from said point together with entrained fine sludge particles.

10. In the recovery of aluminum values from subdivided aluminiferous materials of the nature of bauxite, the process which comprises establishing and maintaining a reaction zone containing particles of such a material of varying size and a caustic leach liquor capable of dissolving alumina from said material, under conditions of elevated temperatures and superatmospheric pressures, maintaining at least part of said aluminiferous material in classified condition in said zone, passing said leach liquor upwardly through said zone and withdrawing the resulting pregnant liquor from the top of said zone under conditions producing the entrainment of fine sludge particles formed in the process.

11. The process of claim 10 wherein the said reaction zone has a cross-section increasing upwardly.

12. The process of claim 10 wherein the said finely divided aluminiferous material has a particle size ranging up to about 5 mm.

13. The process of claim 10 wherein said aluminiferous material is maintained in classified condition at least partially by jets of said leach liquor introduced substantially tangentially in such manner as to maintain the leach liquor in rotary motion.

14. In the recovery of aluminum values from bauxite, the process which comprises passing a caustic leach liquor capable of dissolving alumina, under conditions of elevated temperatures and superatmospheric pressures, upwardly through a reaction containing a mass of subdivided bauxite, the velocity of the leach liquor being sufficient to entrain fine sludge particles formed in the process, keeping the liquor with entrained sludge particles in a rotary motion at the top of said reaction zone and withdrawing the same from a central point.

15. In the recovery of aluminum values from bauxite, the process which comprises passing a caustic leach liquor capable of dissolving alumina, under conditions of elevated temperatures and superatmospheric pressures, upwardly through a reaction zone containing a mass of subdivided bauxite, agitating said bauxite positively thereby producing entrainment in the liquor of sludge particles formed in the process, and withdrawing the resulting pregnant liquor from an upper point in said reaction zone together with entrained fine sludge particles.

16. In the recovery of aluminum values from bauxite, the process which comprises passing a caustic leach liquor capable of dissolving alumina, under conditions of elevated temperatures and superatmospheric pressures, upwardly through a reaction zone containing a mass of subdivided bauxite at a rate sufficient to produce entrainment of sludge particles formed in the process, circulating the leach liquor by passing it outwardly from an upper section and then into a lower section of said zone, the liquor being heated during said circulation, and withdrawing the resulting pregnant liquor from an upper point in said reaction zone together with entrained sludge particles.

17. In the recovery of aluminum values from subdivided aluminiferous materials of the nature of bauxite, the process which comprises establishing a reaction zone containing such a material and a caustic leach liquor capable of dissolving alumina from said material, under conditions of elevated temperatures and superatmospheric pressures, passing said leach liquor upwardly through said zone, withdrawing fine sludge particles formed in the process substantially continuously from the top of said zone by entrainment in the leach liquor, and removing residues from said aluminiferous material periodically from the bottom of said zone.

18. In the recovery of aluminum values from bauxite, the process which comprises passing a caustic leach liquor, which contains a recycled alkali-aluminate solution derived from the process after removal of aluminum values therefrom, under conditions of elevated temperatures and superatmospheric pressures, upwardly through a reaction zone containing a mass of subdivided bauxite at a rate sufficient to produce entrainment of sludge particles formed in the process and withdrawing the resulting pregnant liquor from an upper point in said reaction zone together with entrained fine sludge particles.

19. In the recovery of aluminum values from bauxite, the process which comprises passing a caustic leach liquor capable of dissolving alumina, under conditions of elevated temperatures and superatmospheric pressures, upwardly through a reaction zone containing a mass of subdivided bauxite at a rate sufficient to produce entrainment of sludge particles formed in the process, withdrawing the resulting pregnant liquor from an upper point in said reaction zone together with entrained fine sludge particles, treating said pregnant liquor for recovery of its aluminum values, then concentrating to not over 30° Bé. and recycling the treated liquor to the first step of the process.

20. In the recovery of aluminum values from subdivided aluminiferous materials of the nature of bauxite, the process which comprises establishing and maintaining a reaction zone under elevated temperatures and superatmospheric pressures containing particles of such a material of various sizes and a caustic leach liquor capable of dissolving alumina from said material, maintaining at least part of said aluminiferous material in suspension in said zone, passing said leach liquor upwardly through said zone and withdrawing the resulting pregnant liquor from the top of said zone together with entrained aluminiferous fines and sludge particles formed in the process, passing the withdrawn liquor to another reaction zone maintained at superatmospheric pressures and at elevated temperatures, and completing the extraction of alumina from said aluminiferous fines in said second zone by passing said leach liquor upwardly therethrough with sufficient velocity to remove from the reaction zone fine sludge particles formed in the process.

21. In the recovery of aluminum values from bauxite, the process which comprises passing a caustic leach liquor capable of dissolving alumina upwardly through a reaction zone containing a mass of subdivided bauxite while maintaining said liquor at a temperature of at least about 160° to 180° C. and under pressures exceeding those corresponding to the vapor pressure of said liquor, the rate of flow of said liquor being sufficient to entrain particles of sludge formed in the process and withdrawing the resulting pregnant liquor from an upper point in said reaction zone together with entrained fine sludge particles.

TURE ROBERT HAGLUND.